R. McFARLANE.
SCALE.
APPLICATION FILED JULY 1, 1912.
1,090,819.
Patented Mar. 17, 1914.
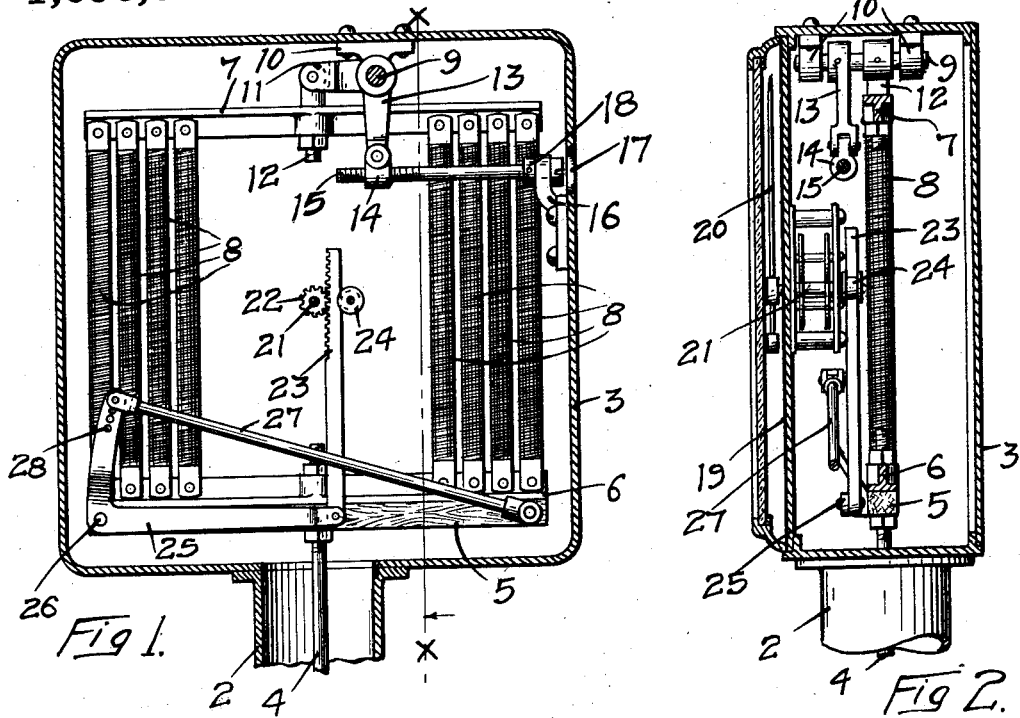
Fig 1.
Fig 2.
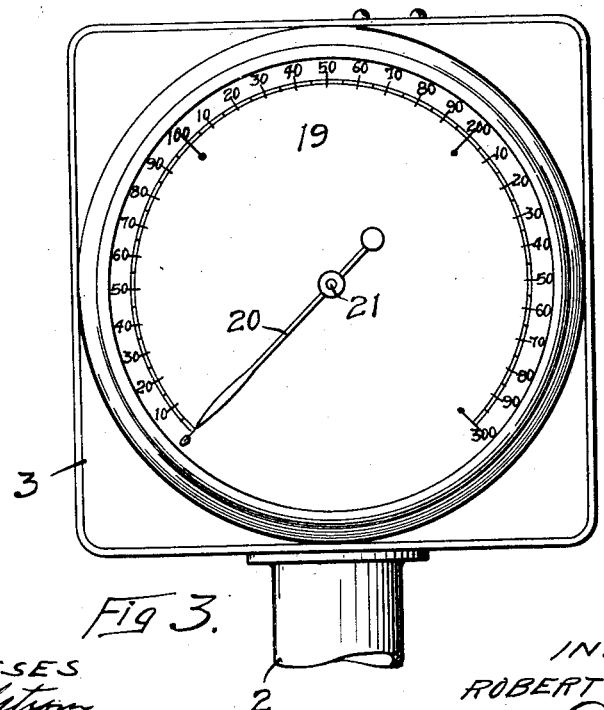
Fig 3.
WITNESSES
INVENTOR
ROBERT McFARLANE
BY
ATTORNEYS

UNITED STATES PATENT OFFICE.

ROBERT McFARLANE, OF ST. PAUL, MINNESOTA, ASSIGNOR TO McFARLANE MANUFACTURING COMPANY, OF CHICAGO, ILLINOIS, A CORPORATION.

SCALE.

1,090,819.      Specification of Letters Patent.     Patented Mar. 17, 1914.

Application filed July 1, 1912. Serial No. 706,996.

*To all whom it may concern:*

Be it known that I, ROBERT McFARLANE, of St. Paul, Ramsey county, Minnesota, have invented certain new and useful Improvements in Scales, of which the following is a specification.

My invention relates to weighing scales of the spring type and the object of my invention is to provide means to compensate for the variation in the springs due to expansion and contraction of the metal under varying atmospheric conditions.

Other objects of the invention will appear from the following detailed description.

The invention consists generally in various constructions and combinations, all as hereinafter described and particularly pointed out in the claims.

In the accompanying drawings forming part of this specification, Figure 1 is a vertical sectional view through the casing of the scale with my invention embodied therein. Fig. 2 is a vertical sectional view on the line $x$—$x$ of Fig. 1. Fig. 3 is a front view of the scale dial.

In the drawing, 2 represents the scale standard supporting a casing or housing 3.

4 is the rod extending to the platform levers of the scale, (not shown) and 5 is a bar, preferably of wood, or other suitable material which will not be materially affected by changes in temperature, secured to the underside of a metal bar 6. To these bars the rod 4 is adjustably connected by a thread and lock nut, as indicated in Fig. 1. The bars 5 and 6 extend across the casing 3 from side to side, near the bottom thereof, and at the top of the casing is a bar 7, preferably of metal, parallel with the bar 6 and connected therewith by a series of coiled springs 8. These springs are arranged in groups at each end of the bars, there being preferably four springs in each group, though this number may be increased or decreased, if preferred. By using a number of springs in each group I am able to compensate for any variation in the movement of the spring due to a defect or flaw in the metal. In other words, if one spring is not suitably constructed to perform its proper functions, another spring of the same group may take its place; therefore I am not obliged to depend on one or two springs for successful operation of the scale.

At the top of the casing I provide a shaft 9 supported in bearings 10, and provided with an arm 11 that is pivotally connected with the bar 7 by a threaded, adjustable pin 12. A second arm 13 is secured on the shaft 9 and is provided with a pivoted block 14 in which a screw 15 is tapped. The head of the screw is supported in a bracket 16 on the wall of the casing opposite the hole 17, longitudinal movement of the screw being prevented by its head and a collar 18. The revolution of the screw will rock the arm 13 and the shaft 9 and raise or lower the bar 7 to increase or decrease the tension on the springs for the purpose of setting the indicator at zero or the starting point.

19 represents a graduated dial having an indicator hand 20 mounted on a spindle 21 which carries a pinion 22. A rack bar 23 meshes with the teeth of the pinion and is held in engagement therewith by an antifriction roller 24. The lower end of the rack bar 23 is pivotally connected with one arm of a bell crank 25 which is pivoted at 26 on the bar 5. The other arm of the bell crank is pivotally connected with one end of the rod 27, the opposite end of which is connected to the bar 5 on the opposite side of its center from the pivotal connection 26. The bar 5, which will not be affected by changes of temperature, will remain substantially the same at all times, while the variation in the springs due to expansion and contraction will be equalized by the rod 27 without materially affecting the rack bar 23 or changing the position of the indicator hand.

I prefer to provide a series of holes 28 in the short arm of the bell crank 25 to allow for the adjustment of the rod 27 and suitable variation in the movement of the bell crank.

To use the scale, the screw 15 is adjusted until the springs are put under tension and the indicator hand is set at zero and weighing of the load on the platform can be accurately performed through the connection of the platform levers with the spring controlled bars 6 and 7. Any variation in the springs, due to changes of temperature, will be equalized and compensated for by means of the bell crank 25, operatively connected with the indicator hand, and the rod 27, connecting the wooden bar 5 with one arm of the bell crank.

I claim as my invention:

1. In a scale, the combination, with a scale rod, of a wooden bar connected thereto, a bell crank pivoted on one end of said bar, an indicator hand and dial, means operatively connecting one arm of said bell crank with said indicator hand, a rod pivotally connecting the other arm of said bell crank with the opposite end of said wooden bar, and springs connected with said wooden bar and arranged to be put under tension by the pull of said scale rod, said bell crank and its connections with said wooden bar compensating for the expansion and contraction of said springs, due to temperature changes.

2. In a scale, a rod for communication with the platform levers, a bar mounted thereon, coiled springs connected at one end to said bar and put under tension by the pull of said rod, an indicator hand and dial, a rack bar and pinion for operating said indicator hand, and mechanism operatively connecting said first named bar with said rack bar for compensating the expansion and contraction of said springs due to temperature changes.

3. A scale comprising a rod for communication with the platform levers, parallel bars, coiled springs connected at their ends to said bars respectively, one of said bars being pivotally supported and the other connected to said rod, an indicator hand and scale therefor, a rack bar and pinion for operating said indicating hand, and compensating means including a member pivotally connecting one of said parallel bars with said rack bar, said compensating means counteracting the variation in said springs due to expansion and contraction with temperature changes.

4. In a scale, the combination, with a scale rod, of a bar connected thereto, a bell crank pivoted on said bar, an indicator hand and dial, a rack bar and pinion, said rack bar being connected to one arm of said bell crank, means pivotally connecting the other arm of said bell crank with said bar, and springs connected to said bar and adapted to be put under tension by the pull of said scale rod, said bell crank and its connections compensating for the expansion and contraction of said springs due to temperature changes.

In witness whereof, I have hereunto set my hand this 20" day of June, 1912.

ROBERT McFARLANE.

Witnesses:
GENEVIEVE E. SORENSEN,
EDWARD A. PAUL.